United States Patent
Friedman et al.

(10) Patent No.: US 7,821,938 B2
(45) Date of Patent: Oct. 26, 2010

(54) ADAPTIVE CODING AND MODULATION FOR SYNCHRONOUS CONNECTIONS

(75) Inventors: Jonathan Friedman, Tel Aviv (IL); Ran Soffer, Tel Mond (IL)

(73) Assignee: Provigent Ltd., Herzliya (IL)

( * ) Notice: Subject to any disclaimer, the term of this patent is extended or adjusted under 35 U.S.C. 154(b) by 634 days.

(21) Appl. No.: 11/788,638

(22) Filed: Apr. 20, 2007

(65) Prior Publication Data
US 2008/0259901 A1    Oct. 23, 2008

(51) Int. Cl.
H04L 12/26    (2006.01)
(52) U.S. Cl. .................. 370/232; 370/230; 370/395.32; 370/395.42; 455/67.11; 455/226.2; 455/226.3
(58) Field of Classification Search ................. 370/324, 370/350, 337, 347, 230, 232, 395.32, 395.42; 455/67.13, 67.11, 226.1, 226.2, 226.3
See application file for complete search history.

(56) References Cited

U.S. PATENT DOCUMENTS

| | | | |
|---|---|---|---|
| 4,310,813 A | 1/1982 | Yuuki et al. |
| 4,321,705 A | 3/1982 | Namiki |
| 4,367,555 A | 1/1983 | Namiki et al. |
| 4,438,530 A | 3/1984 | Steinberger |
| 4,479,258 A | 10/1984 | Namiki |
| 4,557,330 A | 12/1985 | Russell et al. |
| 4,575,862 A | 3/1986 | Tahara et al. |
| 4,606,054 A | 8/1986 | Amitay et al. |
| 4,631,734 A | 12/1986 | Foschini |
| 4,644,562 A | 2/1987 | Kavehrad et al. |
| 4,688,235 A | 8/1987 | Tahara et al. |
| 4,761,784 A | 8/1988 | Srinivasagopalan et al. |
| 4,857,858 A | 8/1989 | Tahara |
| 4,910,468 A | 3/1990 | Ohtsuka et al. |
| 4,914,676 A | 4/1990 | Iwamatsu et al. |

(Continued)

FOREIGN PATENT DOCUMENTS

EP    1365519 A1    11/2003

(Continued)

OTHER PUBLICATIONS

Standard T1.102-1993 of the ANSI®, "American National Standard for Telecommunications—Digital Hierarchy—Electrical Interfaces", Dec. 1993.

(Continued)

*Primary Examiner*—Temica M Beamer
(74) *Attorney, Agent, or Firm*—D. Kligler I.P. Services Ltd.

(57) ABSTRACT

A method for communication includes accepting input data from two or more data sources, one or more of which include continuous synchronous tributaries, for transmission over a wireless communication link having a variable data rate. Relative priorities are assigned to the respective data sources. A currently-available data rate of the communication link is determined. The input data accepted from the data sources is multiplexed to produce a composite data stream. The input data of at least one of the tributaries is selectively omitted from the composite data stream based on the respective relative priorities, in order to match the data rate of the composite data stream to the currently-available data rate of the communication link. The composite data stream is transmitted over the communication link.

42 Claims, 2 Drawing Sheets

U.S. PATENT DOCUMENTS

| | | |
|---|---|---|
| 4,992,798 A | 2/1991 | Nozue et al. |
| 5,023,620 A | 6/1991 | Matsuura |
| 5,068,667 A | 11/1991 | Mizoguchi |
| 5,075,697 A | 12/1991 | Koizumi et al. |
| 5,241,320 A | 8/1993 | Mizoguchi |
| 5,247,541 A | 9/1993 | Nakai |
| 5,268,685 A | 12/1993 | Fujiwara |
| 5,311,545 A | 5/1994 | Critchlow |
| 5,313,467 A | 5/1994 | Varghese et al. |
| 5,383,224 A | 1/1995 | Mizoguchi |
| 5,406,589 A | 4/1995 | Iwamatsu et al. |
| 5,432,522 A | 7/1995 | Kurokami |
| 5,471,508 A | 11/1995 | Koslov |
| 5,495,502 A | 2/1996 | Andersen |
| 5,524,027 A | 6/1996 | Huisken |
| 5,541,951 A | 7/1996 | Juhasz et al. |
| 5,541,955 A | 7/1996 | Jacobsmeyer |
| 5,631,896 A | 5/1997 | Kawase et al. |
| 5,710,799 A | 1/1998 | Kobayashi |
| 5,727,032 A | 3/1998 | Jamal et al. |
| 5,742,646 A | 4/1998 | Woolley et al. |
| 5,809,070 A | 9/1998 | Krishnan et al. |
| 5,838,224 A | 11/1998 | Andrews |
| 5,838,740 A | 11/1998 | Kallman et al. |
| 5,844,950 A | 12/1998 | Aono et al. |
| 5,901,343 A | 5/1999 | Lange |
| 5,905,574 A | 5/1999 | Vollbrecht et al. |
| 5,920,595 A | 7/1999 | Iwamatsu |
| 5,940,453 A | 8/1999 | Golden |
| 5,987,060 A | 11/1999 | Grenon et al. |
| 6,215,827 B1 | 4/2001 | Balachandran et al. |
| 6,236,263 B1 | 5/2001 | Iwamatsu |
| 6,262,994 B1 | 7/2001 | Dirschedl et al. |
| 6,418,164 B1 | 7/2002 | Endres et al. |
| 6,452,964 B1 | 9/2002 | Yoshida |
| 6,466,562 B1 | 10/2002 | Yoshida et al. |
| 6,501,953 B1 | 12/2002 | Braun et al. |
| 6,611,942 B1 | 8/2003 | Battistello et al. |
| 6,628,707 B2 | 9/2003 | Ratie et al. |
| 6,647,059 B1 | 11/2003 | Faruque |
| 6,665,810 B1 | 12/2003 | Sakai |
| 6,678,259 B1 | 1/2004 | Schwengler |
| 6,826,238 B2 | 11/2004 | Ahn |
| 6,829,298 B1 | 12/2004 | Abe et al. |
| 6,836,515 B1 | 12/2004 | Kay et al. |
| 6,888,794 B1 | 5/2005 | Jovanovic et al. |
| 6,915,463 B2 | 7/2005 | Vieregge et al. |
| 6,920,189 B1 | 7/2005 | Spalink |
| 6,954,504 B2 | 10/2005 | Tiedemann, Jr. et al. |
| 7,003,042 B2 | 2/2006 | Morelos-Zaragoza et al. |
| 7,016,296 B2 | 3/2006 | Hartman |
| 7,046,753 B2 | 5/2006 | Resheff et al. |
| 7,047,029 B1 | 5/2006 | Godwin et al. |
| 7,133,425 B2 | 11/2006 | McClellan |
| 7,133,441 B1 | 11/2006 | Barlev et al. |
| 7,187,719 B2 | 3/2007 | Zhang |
| 7,200,188 B2 | 4/2007 | Fague et al. |
| 7,254,190 B2 | 8/2007 | Kwentus et al. |
| 7,333,556 B2 | 2/2008 | Maltsev et al. |
| 7,366,091 B1 | 4/2008 | Lahti et al. |
| 7,418,240 B2 | 8/2008 | Hsu et al. |
| 7,460,583 B2 | 12/2008 | Khayrallah et al. |
| 7,463,867 B2 | 12/2008 | Luo et al. |
| 7,492,701 B2 | 2/2009 | Song et al. |
| 2001/0017897 A1 | 8/2001 | Ahn |
| 2002/0016933 A1 | 2/2002 | Smith et al. |
| 2002/0051498 A1 | 5/2002 | Thomas et al. |
| 2002/0061752 A1 | 5/2002 | Kurokami |
| 2002/0181490 A1 | 12/2002 | Frannhagen et al. |
| 2003/0021370 A1 | 1/2003 | Menkhoff |
| 2003/0043778 A1 | 3/2003 | Luschi et al. |
| 2003/0066082 A1 | 4/2003 | Kliger et al. |
| 2003/0135532 A1 | 7/2003 | Peting |
| 2003/0203721 A1 | 10/2003 | Berezdivin et al. |
| 2004/0017860 A1 | 1/2004 | Liu |
| 2004/0063416 A1 | 4/2004 | Kuenen et al. |
| 2004/0081081 A1 | 4/2004 | Colombo |
| 2004/0086668 A1 | 5/2004 | Dronzek et al. |
| 2004/0151108 A1 | 8/2004 | Blascoet et al. |
| 2004/0217179 A1 | 11/2004 | Garner |
| 2005/0002474 A1 | 1/2005 | Limberg |
| 2005/0010853 A1 | 1/2005 | Duvant et al. |
| 2005/0063496 A1 | 3/2005 | Guillouard et al. |
| 2005/0075078 A1 | 4/2005 | Makinen et al. |
| 2005/0169401 A1 | 8/2005 | Abraham et al. |
| 2005/0190868 A1 | 9/2005 | Khardekar et al. |
| 2005/0239398 A1 | 10/2005 | Lai |
| 2005/0265436 A1 | 12/2005 | Suh et al. |
| 2005/0286618 A1 | 12/2005 | Abe |
| 2006/0008018 A1 | 1/2006 | Kolze |
| 2006/0013181 A1 | 1/2006 | Stolpman et al. |
| 2006/0056554 A1 | 3/2006 | Lin et al. |
| 2006/0093058 A1 | 5/2006 | Skraparlis |
| 2006/0107179 A1 | 5/2006 | Shen et al. |
| 2006/0203943 A1 | 9/2006 | Scheim et al. |
| 2006/0209939 A1 | 9/2006 | Mantha |
| 2007/0076719 A1 | 4/2007 | Allan et al. |
| 2007/0116143 A1 | 5/2007 | Bjerke et al. |
| 2007/0116162 A1 | 5/2007 | Eliaz et al. |
| 2007/0133397 A1 | 6/2007 | Bianchi et al. |
| 2007/0153726 A1 | 7/2007 | Bar-Sade et al. |
| 2007/0230641 A1 | 10/2007 | Yehudai |
| 2008/0002581 A1 | 1/2008 | Gorsotman et al. |
| 2008/0008257 A1 | 1/2008 | Yonesi et al. |
| 2008/0080634 A1 | 4/2008 | Kotecha et al. |
| 2008/0130616 A1 | 6/2008 | Wengerter et al. |
| 2008/0130726 A1 | 6/2008 | Sofer et al. |
| 2008/0155373 A1 | 6/2008 | Friedman et al. |
| 2008/0254749 A1 | 10/2008 | Ashkenazi et al. |
| 2009/0022239 A1 | 1/2009 | Kimura et al. |
| 2009/0049361 A1 | 2/2009 | Koren et al. |
| 2009/0092208 A1 | 4/2009 | Montekyo et al. |

FOREIGN PATENT DOCUMENTS

| | | |
|---|---|---|
| EP | 1 435 146 | 5/2005 |
| JP | 6021762 A | 1/1994 |
| JP | 9064791 A | 3/1997 |
| WO | 0060802 A1 | 10/2000 |
| WO | 0076114 A1 | 12/2000 |
| WO | 0077952 A1 | 12/2000 |
| WO | 2004086668 A1 | 10/2004 |
| WO | WO 2006/097735 | 9/2006 |
| WO | 2006118892 A1 | 11/2006 |
| WO | 2007040906 A2 | 4/2007 |

OTHER PUBLICATIONS

G.703 of the ITU, "General Aspects of Digital Transmission Systems—Terminal Equipments—Physical/Electrical Characteristics of Hierarchical Digital Interfaces", Geneva, Switzerland 1991.

G.704 of the ITU, "Series G: Transmission Systems and Media, Digital Systems and Networks, Digital Transmission Systems—Terminal Equipments—General, Synchronous Frame Structures Used at 1544, 6312, 2048, 8448 and 44736 kbit/s Hierarchical Levels", Oct. 1998.

ITU-T G.783, "General Aspects of Digital Transmission Systems; Terminal Equipments—Characteristics of Synchronous Digital Hierarchy (SDH) Equipment Functional Blocks", Jan. 1994.

ITU-T G.707/Y.1322, "Series G: Transmission systems and media, digital systems and networks, digital terminal equipments—general; series Y: global information infrastructure and internet protocol aspects, internet protocol aspects— transport network node interface for the synchronous digital hierarchy (SDH)".

GR-253-CORE by Telcordia™ Technologies, "Synchronous optical network (SONET) transport systems: common generic criteria", Issue 3, Sep. 2000.

Alliance, "Synchronous optical network (SONET)—basic description including multiplex structure, rates and format", 2002.

Riegel, "Requirements for edge-to-edge emulation of time division multiplexed (TDM) circuits over packet switching networks", RFC 4197, Oct. 2005.

Gallager, "Low-Density Parity-Check Codes", IRE Transactions on Information Theory, vol. 7, Jan. 1962, pp. 21-28.

Ryan and Vasic "An Introduction to LDPC Codes", GlobeCom 2003, San Francisco, California, Dec. 5, 2003.

Worthen and Stark, "Unified Design of Iterative Receivers using Factor Graphs", IEEE Transactions on Information Theory, (47:2), Feb. 2001, pp. 843-849.

Richardson and Urbanke, "An Introduction to the Analysis of Iterative Coding Systems", Proceedings of the 1999 Institute for Mathematics and its Applications (IMA) Summer Program: Codes, Systems and Graphical Models, Minneapolis, Minnesota, Aug. 2-6, 1999.

Pottie and Taylor, "Multilevel Codes Based on Partitioning", IEEE Transactions on Information Theory (35:1), Jan. 1989, pp. 87-98.

Hideki, et al., "A New Multilevel Coding Method Using Error-Correcting Codes", IEEE Transactions on Information Theory, vol. IT-23, No. 3, 1977.

A.R. Calderbank, "Multilevel Codes and Multistage Decoding", IEEE Transactions on Communications, vol. 37, No. 3, Mar. 1989.

Huaning Niu, et al., "Iterative Channel Estimation and LDPC Decoding over Flat-Fading Channels: A Factor Graph Approach", 2003 Conference on Information Sciences and Systems, The Johns Hopkins University, Mar. 12-14, 2003.

Xiaowei Jin, et al., "Analysis of Joint Channel Estimation and LDPC Decoding on Block Fading Channels", International Symposium on Information Theory and its Applications, ISITA2004, Parma, Italy, Oct. 10-13, 2004.

Jian Sun, "An Introduction to Low Density Parity Check (LDPC) Codes", West Virginia University, Jun. 3, 2003.

Dr. Lin-Nan Lee, "LDPC Codes, Application to Next Generation Communication Systems", Hughes Network System, Oct. 8, 2003.

Hassan, "LPDC encoded pilots for iterative receiver improvement", pp. 1-30, Dec. 2005.

U.S. Appl. No. 11/394,172 Official Action dated Jun. 26, 2009.
U.S. Appl. No. 11/479,050 Official Action dated Jul. 24, 2009.
U.S. Appl. No. 11/479,050 Official Action dated Mar. 4, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.
U.S. Appl. No. 11/634,781 Official Action dated Mar. 2, 2010.

U.S. Appl. No. 11/787,059 Official Action dated Mar. 3, 2010.
U.S. Appl. No. 11/394,172 Official Action dated Mar. 2, 2010.

Benani et al., "Comparison of Carrier Recovery Techniques in M-QAM Digital Communications Systems", Proceedings of 13th Annual Canadian Conference on Electrical and Computer Engineering, pp. 73-77, Halifax, Canada, Mar. 7-10, 2000.

Best R., "Phase Locked Loops: Design, Simulation, and Applications", McGraw Hill Professional, 5th Edition, pp. 81-92, Jun. 20, 2003.

Colavolpe et al., "Algorithms for iterative decoding in the presence of strong phase noise", IEEE Journal on Selected Areas in Communications, vol. 23, No. 9, pp. 1748-1757, Sep. 2005.

Goeckel D., "Adaptive Coding for Time-Varying Channels Using Outdated Fading Estimates", IEEE Transactions on Communications, vol. 47, No. 6, Jun. 1999.

Duel-Hallen et al., "Long Range Prediction of Fading Signals: Enabling Adaptive Transmission for Mobile Radio Channels" IEEE Signal Processing Magazine, vol. 17, No. 3, pp. 62-75, May 2000.

Gagnon et al., "A Simple and Fast Carrier Recovery Algorithm for High-Order QAM", IEEE Communications Letters, vol. 9, No. 10, pp. 918-920, Oct. 2005.

Ericsson AB, "Capacity without ties; Mini-Link microwave transmission solution", EN/LZT 712 0117 R2, Molndal, Sweden, 2005.

Hu et al., "Adaptive Modulation Using Long Range Prediction for Flat Rayleigh Fading Channels", Proceedings of the IEEE International Symposium on Information Theory, Sorrento, Italy, Jun. 25-30, 2000.

ITU Recommendation G.707/Y.1322, "Series G: Transmission systems and media, digital systems and networks, digital terminal equipments—general: Series Y: global information infrastructure and internet protocol aspects—transport; Network node interface for the syncronours digital hierarchy (SDH)", Oct. 2000.

Johnson et al., "Blind Equalization Using the Constant Modulus Criterion: A Review", Proceedings of the IEEE, vol. 86, No. 10, Oct. 1998.

Kim et al., "Design of Carrier Recovery Algorithm for High-Order QAM with Large Frequency Acquisition Range", IEEE Internatinal Conference on Communications (ICC), pp. 1016-1020, vol. 4, Helsinki, Finland, Jun. 11-14, 2001.

Kschischang F., "Capacity Approching Codes, Iterative Decoding Algorithms and Their Application: Codes defined on Graphs", IEEE Communications Magazine, pp. 118-125, Aug. 2003.

Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Richardson etr al., "Capacity Approaching codes; Iterative Decoding Algorithms and Their Application: The Renaissance of Gallager's Low-Densityy parity Check Codes", IEEE Communications Magazine, pp. 126-131, Aug. 2003.

Saroka et al., "Joint Carrier Phase Estimation and Turbo Decoding Using Bit-Carrier-Phase APP Decoder", IEEE Transactions on Communications, 2004.

Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.

U.S. Appl. No. 11/285,414 Official Action dated Mar. 6, 2009.
U.S. Appl. No. 11/285,414 Official Action dated May 23, 2008.
U.S. Appl. No. 11/285,414 Official Action dated Nov. 12, 2008.
U.S. Appl. No. 11/394,172 Official Action dated Jan. 21, 2009.
U.S. Appl. No. 11/394,172 Official Action dated Jun. 16, 2008.
U.S. Appl. No. 11/787,059 Official Action dated Jul. 9, 2010.
U.S. Appl. No. 11/634,781 Official Action dated Sep. 21, 2009.
U.S. Appl. No. 11/645,828 Official Action dated Sep. 15, 2009.
Hassan, "LPDC encoded pilots for iterative receiver improvements", pp. 1-30 Dec. 2005.

FIG. 1

ADAPTIVE CODING AND MODULATION FOR SYNCHRONOUS CONNECTIONS

FIELD OF THE INVENTION

The present invention relates generally to communication links, and particularly to methods and systems for transporting synchronous connections over variable-rate communication links.

BACKGROUND OF THE INVENTION

Some communication links vary their data transmission rate, such as in response to varying channel conditions. Various methods and systems for operating variable-rate communication links are known in the art. For example, U.S. Patent Application Publication 2005/0075078, whose disclosure is incorporated herein by reference, describes a point-to-point packet microwave radio link. In order to improve the efficiency on the radio link, packets are classified before transmission based on at least one Quality-of-Service (QoS) parameter assigned to each packet. The signals are modulated with a real-time adaptive modulation. The modulation is adapted based on the current traffic amount, on signal quality measurements indicative of the propagation conditions on the radio link, and on the classification of packets comprised in the signals.

Many communication systems and services use continuous synchronous connections, also referred to as synchronous tributaries. Some synchronous connections carry data in accordance with a certain Time-Division-Multiplexing (TDM) protocol, in which multiple data streams are multiplexed together. In some cases, the data streams are multiplexed in a hierarchical structure.

Synchronous connections may comprise, for example, T1 connections or E1 connections. Higher rate synchronous connections may comprise multiple T1 or E1 carriers, such as T2, T3 and E2, E3 links. (T1, T2, . . . links are also referred to as DS1, DS2, . . . ) The DS1, DS2 and DS3 links are specified in standard T1.102-1993 of the American National Standards Institute (ANSI®) entitled "American National Standard for Telecommunications—Digital Hierarchy—Electrical Interfaces," December, 1993, which is incorporated herein by reference.

In some applications, multiple synchronous digital connections are multiplexed to produce high data rate synchronous connections, such as in the Plesiochronous Digital Hierarchy (PDH), Synchronous Digital Hierarchy (SDH) and Synchronous Optical Network (SONET) architectures. The PDH architecture is described, for example, in recommendation G.703 of the International Telecommunication Union (ITU) entitled "General Aspects of Digital Transmission Systems—Terminal Equipments—Physical/Electrical Characteristics of Hierarchical Digital Interfaces," Geneva, Switzerland, 1991, and in recommendation G.704 of the ITU Telecommunication Standardization Sector (ITU-T), entitled "Series G: Transmission Systems and Media, Digital Systems and Networks, Digital Transmission Systems—Terminal Equipments—General, Synchronous Frame Structures used at 1544, 6312, 2048, 8448 and 44736 Kbit/s Hierarchical Levels," October, 1998, which are incorporated herein by reference.

The SDH architecture is described, for example, in ITU-T recommendation G.783, entitled "General Aspects of Digital Transmission Systems; Terminal Equipments—Characteristics of Synchronous Digital Hierarchy (SDH) Equipment Functional Blocks," January, 1994, and in ITU-T recommendation G.707/Y.1322 entitled "Series G: Transmission Systems and Media, Digital Systems and Networks, Digital Terminal Equipments—General; Series Y: Global Information Infrastructure and Internet Protocol Aspects, Internet Protocol Aspects—Transport Network Node Interface for the Synchronous Digital Hierarchy (SDH)," which are incorporated herein by reference.

SONET is described, for example, in standard GR-253-CORE by Telcordia™ Technologies (Piscataway, N.J.), entitled "Synchronous Optical Network (SONET) Transport Systems: Common Generic Criteria," Issue 3, September, 2000, chapters 1-4, and in a standard published by the Alliance for Telecommunications Industry Solutions (ATIS) entitled "Synchronous Optical Network (SONET)—Basic Description including Multiplex Structure, Rates and Format," 2002, which are incorporated herein by reference.

SUMMARY OF THE INVENTION

Embodiments of the present invention provide a method for communication, including:

accepting input data from two or more data sources, one or more of which include continuous synchronous tributaries, for transmission over a wireless communication link having a variable data rate;

assigning respective relative priorities to the data sources;

determining a currently-available data rate of the communication link;

multiplexing the input data accepted from the data sources to produce a composite data stream;

selectively omitting the input data of at least one of the tributaries from the composite data stream based on the respective relative priorities, in order to match the data rate of the composite data stream to the currently-available data rate of the communication link; and transmitting the composite data stream over the communication link.

In some embodiments, the input data in each of the tributaries is multiplexed using Time-Division-Multiplexing (TDM). In a disclosed embodiment, the communication link includes a point-to-point link.

Determining the currently-available data rate typically includes receiving the transmitted composite data stream at an opposite side of the communication link, estimating a reception quality of the received composite data stream, and determining the currently-available data rate responsively to the estimated reception quality. In an embodiment, estimating the reception quality includes evaluating a reception quality metric including at least one metric selected from a group of metrics consisting of a Received Signal Level (RSL), a Signal to Noise Ratio (SNR), a Signal to Interference and Noise Ratio (SINR), a Mean Square Error (MSE), a Bit Error Rate (BER) and a Frame Error Rate (FER) of the received composite data stream.

In another embodiment, transmitting the composite data stream includes encoding the composite data stream using a Forward Error Correction (FEC) code, receiving the transmitted composite data stream includes decoding the FEC code using a FEC decoder, and estimating the reception quality includes estimating the reception quality using a metric provided by the FEC decoder. In yet another embodiment, receiving the transmitted composite data stream includes filtering the received composite data stream using an adaptive equalizer including adaptive coefficients, and the reception quality metric is based on values of the adaptive coefficients.

In still another embodiment, transmitting the composite data stream includes selecting an Adaptive Coding and Modulation (ACM) profile, which corresponds to the currently-available data rate, from a set of predetermined ACM profiles that define respective modulation schemes and Forward Error Correction (FEC) codes, encoding the composite data stream using a FEC code defined by the selected ACM profile and modulating the encoded data stream using a modulation scheme defined by the selected ACM profile.

In a disclosed embodiment, assigning the relative priorities includes specifying in each ACM profile which of the data sources to omit from the composite data stream when selecting the ACM profile, and multiplexing the input data includes omitting the input data of the data sources specified in the selected ACM profile out of the composite data stream.

In some embodiments, accepting the input data includes accepting a sequence of data packets that encapsulate one of the synchronous tributaries, and omitting the input data of the one of the tributaries from the composite data stream includes discarding the data packets in the sequence.

In an embodiment, one or more of the data sources include packet sources, accepting the input data includes accepting data packets for transmission over the communication link from the packet sources, assigning the relative priorities includes jointly assigning the priorities to the tributaries and to the packets, and multiplexing the input data includes jointly multiplexing the input data accepted from the tributaries and the data packets accepted from the packet sources, while selectively regulating a flow of the data packets. Assigning the priorities to the packets may include assigning a respective priority value individually to each packet. Alternatively, assigning the priorities to the packets may include assigning a respective priority value to each of the packet sources.

In another embodiment, assigning the relative priorities includes computing numerical scores of the respective tributaries based on attributes of the tributaries, and selectively omitting the input data from the composite data stream includes progressively omitting the tributaries having the lowest scores, until the data rate of the composite data stream does not exceed the currently-available data rate of the communication link.

In yet another embodiment, the method includes receiving the transmitted composite data stream by a receiver at an opposite side of the communication link and de-multiplexing the received composite data stream, so as to reconstruct the input data. Transmitting the composite data stream may include indicating which of the data sources are multiplexed in the composite data stream to the receiver, so as to enable the receiver to de-multiplex the received composite data stream.

In still another embodiment, the input data of at least one of the tributaries includes hierarchically-structured TDM data. In a disclosed embodiment, the communication link includes one of a microwave and a millimeter-wave link. In some embodiments, the wireless communication link is one of a plurality of wireless communication links operated in a point-to-multipoint configuration.

There is also provided, in accordance with an embodiment of the present invention, a method for communication, including:

accepting input data from two or more data sources, one or more of which include continuous synchronous tributaries, for transmission over a wireless communication link having a variable data rate;

assigning respective relative priorities to the data sources;

determining a currently-available data rate of the communication link;

multiplexing the input data accepted from the data sources to produce a composite data stream;

selectively omitting the input data of at least one of the data sources from the composite data stream based on the respective relative priorities, in order to match the data rate of the composite data stream to the currently-available data rate of the communication link; and transmitting the composite data stream over the communication link.

There is additionally provided, in accordance with an embodiment of the present invention, a communication apparatus, including:

a combiner, which is arranged to multiplex input data that is accepted from two or more data sources, one or more of which include continuous synchronous tributaries, to produce a composite data stream;

a variable-rate transmitter, which is arranged to transmit the composite data stream over a communication link at a currently-available data rate of the communication link; and a processor, which is arranged to determine the currently-available data rate and to cause the combiner to selectively omit the input data of at least one of the tributaries from the composite data stream based on relative priorities assigned to the data sources, in order to match the data rate of the composite data stream to the currently-available data rate of the communication link.

The present invention will be more fully understood from the following detailed description of the embodiments thereof, taken together with the drawings in which:

DETAILED DESCRIPTION OF EMBODIMENTS

Overview

When operating a variable-rate communication link, such as a link that uses Adaptive Coding and Modulation (ACM), the data rate that is currently available for transmission changes over time. The link data rate may be varied in response to changes in channel conditions, as well as other factors. Synchronous connections, on the other hand, typically use specific fixed data rates and have little or no data rate flexibility. The inherent fixed rate nature of synchronous connections causes considerable difficulty in transporting such connections over variable-rate communication links.

Embodiments of the present invention that are described hereinbelow provide methods and systems for efficiently transporting synchronous connections over variable-rate communication links. In some embodiments, a transmitting system communicates with a receiving system over a point-to-point wireless communication link. The transmitting system accepts input data from a number of continuous, synchronous tributaries. The transmitting system determines the data rate that is currently-available for transmission, often based on information that is fed-back from the receiving system. A combiner in the transmitting system multiplexes the input data accepted from the synchronous tributaries to produce a composite data stream, which is transmitted over the link at the currently-available data rate.

In order to match the data rate of the composite data stream to the currently-available data rate of the link, the combiner selectively blocks the input data of at least some of the synchronous tributaries, before the input data is multiplexed.

The selective blocking operation is typically based on relative priorities that are assigned to the tributaries. For example, some synchronous connections may carry data services while other synchronous connections carry voice. Data connections are typically more tolerant to temporary interruptions than voice connections. In data connections, temporary interruptions can often be detected and compensated for by higher communication layers. Voice connections, on the other hand, are highly sensitive to interruptions because of their low latency, real-time nature. For this reason, synchronous connections that carry data are often given priority over connections that carry voice.

In some embodiments, the transmitter also transports packet data arriving from one or more packet sources, in addition to the synchronous tributaries. The packets or packet sources are also assigned relative priorities. The transmitter regulates the flow of packets from these sources, so that the composite data stream, which comprises the data originating from both the tributaries and the packet sources, has a data rate that matches the currently-available data rate of the communication link.

System Description

Figure 1:
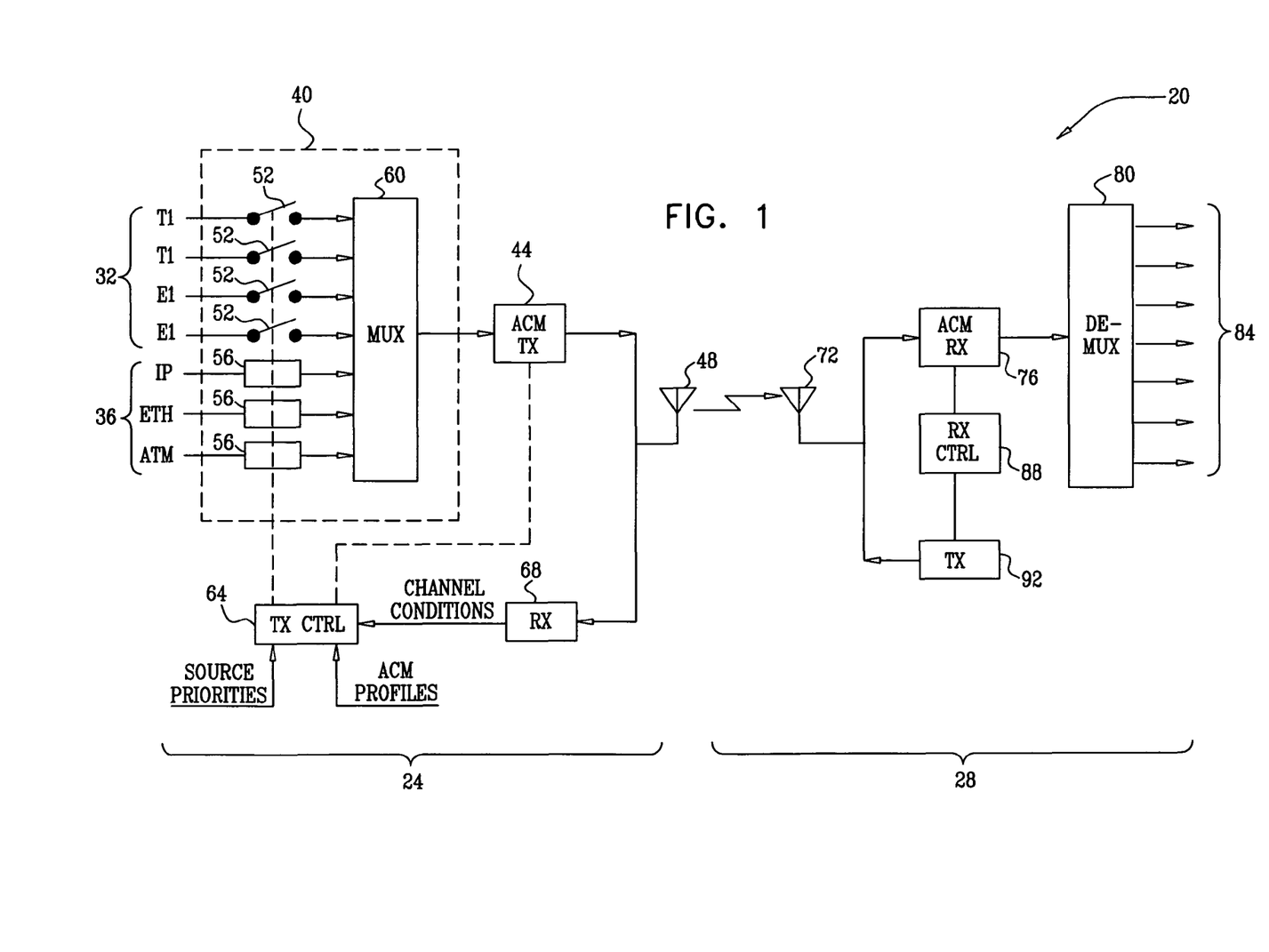
FIG. 1 is a block diagram that schematically illustrates a communication link, in accordance with an embodiment of the present invention.

FIG. 1 is a block diagram that schematically illustrates a communication link 20, in accordance with an embodiment of the present invention. Link 20 comprises a transmitting (TX) system 24 and a receiving (RX) system 28, which communicate over a wireless channel. In some embodiments, link 20 comprises a point-to-point microwave link, although the principles of the present invention can be used in any type of communication link.

The description that follows addresses the process of transporting synchronous connections from system 24 to system 28. For this reason, system 24 is referred to as a transmitting system and system 28 is referred to as a receiving system, even though, as will be shown below, systems 24 and 28 communicate in both directions. In the exemplary embodiment of FIG. 1, the reverse direction of the link (from RX system 28 to TX system 24) is used as a feedback channel for link management purposes. In some embodiments, however, link 20 comprises a bidirectional link, which transports synchronous connections in both directions at variable data rates. In these configurations, the methods and systems described herein can be implemented in both directions of the link.

TX system 24 accepts input data for transmission over the link from multiple tributaries 32. The input data in each tributary conforms to a certain synchronous protocol or standard. In the context of the present patent application and in the claims, the terms "synchronous connection" and "tributary" are used to describe any communication connection in which data is transmitted in accordance with a streaming, continuous protocol, whose timing is synchronized between the transmitting side and the receiving side. In some cases, although not necessarily, the data in a synchronous tributary is multiplexed using Time Division Multiplexing (TDM). Synchronous connections may comprise, for example, T1 and E1 connections, connections that include multiple T1 or E1 links, high capacity links such as Synchronous Transfer Mode 1 (STM-1) links, as well as hierarchically-structured connections such as PDH, SDH and SONET. Note that plesiochronous connections, such as PDH and SONET, are also considered to be synchronous connections in the present context.

In some embodiments, link 20 may also transport packet data in addition to the synchronous connections. In these embodiments, TX system 24 accepts packets from one or more packet sources 36. The packets may comprise, for example, Internet Protocol (IP) packets, Ethernet™ packets, Asynchronous Transfer Mode (ATM) packets, or packets conforming to any other suitable protocol or standard.

TX system 24 comprises a combiner 40, which combines the input data accepted from tributaries 32 and packet sources 36, and produces a single composite data stream. A transmitter (TX) 44 transmits the composite data stream over the wireless channel to RX system 28. TX 44 typically encodes the composite data stream using a suitable Forward Error Correction (FEC) code and modulates the encoded data stream using a suitable modulation scheme. The transmitter then coverts the modulated signal to an analog signal, up-converts it to a suitable radio frequency (RF), and then amplifies and transmits the RF signal via a transmit antenna 48.

RX system 28 comprises a receiver (RX) 76, which receives the RF signal via a receive antenna 72. The receiver down-converts the RF signal, digitizes the signal, demodulates the modulated signal in accordance with the modulation scheme used and decodes the FEC. Receiver 76 thus reconstructs the composite data stream produced by combiner 40. A demultiplexer 80 separates the composite data stream, so as to extract the different synchronous tributaries and packets. Demultiplexer 80 produces multiple outputs 84, which generally have one-to-one correspondence to tributaries 32 and packet sources 36.

Transmitter 44 and receiver 76 operate at a variable data rate. Typically, the data rate used over the link (i.e., the data rate of the modulated and encoded signal transmitted by TX 44) is varied in accordance with the conditions of the wireless channel. When channel conditions are good, the data rate can be increased to enable higher throughput. When channel conditions deteriorate, the data rate is decreased, in order to improve the link budget.

In some cases, link 20 operates in accordance with a certain Bit Error Rate (BER) requirement or other Quality-of-Service (QoS) constraint. In these cases, the link data rate is selected, given the current channel conditions, so as to comply with the QoS constraint. In alternative embodiments, the link data rate may depend on other factors, such as the Signal to Noise Ratio (SNR) measured at the receiver.

In some embodiments, TX 44 and RX 76 vary the link data rate by using Adaptive Coding and Modulation (ACM). In ACM, the FEC code rate and the signal constellation used for modulation are jointly selected to produce the desired data rate and/or quality of service. Typically, two or more combinations of code rate and signal constellation are predefined. Each combination of code rate and signal constellation is referred to herein as an ACM profile. A suitable ACM profile is selected and coordinated between the TX and RX modems.

TX system 24 comprises a TX controller 64, and RX system 28 comprises an RX controller 88. Typically, controllers 64 and 88 comprise general-purpose processors, which are programmed in software to carry out the functions described herein. The software may be downloaded to the processors in electronic form, such as over a network or from the opposite side of the link over the wireless channel. Each controller manages the operation of its respective system. In particular, the two controllers coordinate the data rate selection process (e.g., ACM profile selection) between systems 24 and 28. In order to coordinate the data rate selection, controllers 64 and 88 exchange management information with one another.

TX controller 64 may send the management information to RX controller 88 by embedding the information in the composite data stream sent from TX 44 to RX 76. In the opposite direction, RX controller 88 sends management information to TX controller 64 using a feedback channel. In the embodiment of FIG. 1, RX system 28 comprises a feedback transmitter 92, which transmits the management information to a feedback receiver 68 in TX system 24. Alternatively, when link 20 comprises a bidirectional link, the functionality of the feedback channel can be embodied in the transmitter and receiver of the opposite link direction.

The selection of a suitable ACM profile is typically based on the estimated reception quality at RX 76. RX 76 and/or RX controller 88 estimate the reception quality, and report the estimated quality (or the resulting ACM profile) over the feedback channel to TX controller 64. Based on the estimated reception quality, controllers 88 and 64 determine the currently-available data rate of the link and the appropriate ACM profile. The reception quality estimation and ACM profile selection functions can be divided in different ways between systems 24 and 28. For example, RX controller 88 may estimate the reception quality, select an appropriate ACM profile, and indicate the selected profile to TX controller 64. In an alternative embodiment, the RX controller reports the estimated reception quality, and the TX controller selects the ACM profile accordingly.

RX 76 and/or RX controller 88 may use any suitable quality metric for estimating the reception quality. The quality metric may comprise, for example, the Received Signal Level (RSL), Signal to Noise Ratio (SNR), Signal to Interference and Noise Ratio (SINR) or the Mean Square Error (MSE) of the received signal. Alternatively, the reception quality metric may comprise a Bit Error Rate (BER) or Frame Error Rate (FER) of the received signal, either before or after error Correction by the FEC code.

In some embodiments, RX 76 comprises an adaptive equalizer, which filters the received signal. The equalizer typically comprises a digital filter having a set of coefficients, whose values are adapted in order to compensate for the response of the wireless channel and other impairments. In these embodiments, the reception quality may be estimated using the equalizer coefficient values. For example, the reception quality metric may comprise a ratio between the energy of the coefficient having the largest absolute value and the total energy of all equalizer coefficients. Alternatively, the metric may comprise a ratio between the energy of the largest absolute value coefficient and between the total energy of all other equalizer coefficients, excluding the largest coefficient.

In some embodiments, the FEC code used by TX 44 and RX 76 produces metrics, which can be used as quality metrics for estimating the reception quality of the link. For example, the FEC may comprise an iterative code, such as a Low Density Parity Check (LDPC) code or a Turbo code, which are well-known in the art. Decoders of iterative codes often produce metrics such as Likelihood Ratios (LR) or Log Likelihood Ratios (LLR), which can be used as reception quality metrics.

Some FEC code decoders, particularly decoders of block codes, produce metrics that indicate the decoding performance or success. For example, block code decoders often indicate whether a decoded block contains errors, i.e., whether a legitimate code word was found. The decoder may also indicate the number of errors found in a particular block. Such FEC decoder metrics can also be used as reception quality metrics. Alternatively, any other suitable metric, as well as combinations of the metrics described above, can also be used for this purpose.

Transporting Fixed-Rate Synchronous Tributaries Over a Variable-Rate Link

Regardless of the specific mechanisms and criteria used by TX 44 and RX 76 for determining and varying the link data rate, at any given time the link has a certain currently-available data rate that can be used for transferring data from TX system 24 to RX system 28. Obviously, the currently-available data rate forms an upper bound on the data rate of the composite data stream produced by combiner 40.

The currently-available data rate varies over time, e.g., in response to varying channel conditions. Tributaries 32, on the other hand, have fixed data rates. For example, a T1 tributary has a fixed data rate of 1.544 Mbits per second. In order to match the data rate of the composite data stream to the currently-available data rate of the link, combiner 40 selectively blocks the data of at least some of tributaries 32 before multiplexing the data.

When the currently-available data rate is high (e.g., when channel conditions are good), combiner 40 allows the data of all tributaries to be multiplexed into the composite data stream. When the currently-available data rate of the link decreases, such as when channel conditions deteriorate, the data rate of the composite data stream should be reduced accordingly. Combiner 40 selectively blocks some of the tributaries and consequently reduces the data rate of the composite data stream.

In some embodiments, combiner 40 comprises blocking units 52, which are controlled by TX controller 64. Each blocking unit 52 can either block the data of its respective tributary, or allow the data to pass, as controlled by the TX controller. Combiner 40 comprises a multiplexer (MUX) 60, which multiplexes the tributaries whose data is not blocked, to produce the composite data stream. Using the selective blocking operation, TX controller 64 can increase or decrease the data rate of the composite data stream, so as to match the currently-available data rate of the link.

Blocking units 52 may comprise switches or similar circuits that physically disconnect the respective tributaries from MUX 60. Alternatively, the blocking functionality can be implemented without physically blocking the data, by changing the sequence in which MUX 60 multiplexes the tributaries. For example, in order to block a certain tributary, TX controller 64 can instruct MUX 60 to skip this tributary in the multiplexing sequence.

In some embodiments, combiner 40 may apply various buffering, backpressure or other flow control mechanisms toward the sources of tributaries 32, in order to notify the sources regarding the blocking action and to possibly reduce the amount of data loss. Any suitable flow control mechanism known in the art can be used for this purpose. Alternatively, tributaries can be blocked without notification or coordination with their sources.

In some embodiments, one or more of the synchronous tributaries are encapsulated in respective streams of data packets. For example, an E1 link that carries data can be encapsulated over IP packets using Pseudo-Wire (PW). Methods for Pseudo-Wire emulation of TDM circuits over packet networks are described, for example, by Riegel in a "Requirements for Edge-to-Edge Emulation of Time Division Multiplexed (TDM) Circuits over Packet Switching Networks," Request For Comments (RFC) 4197 of the Internet Engineering Task Force (IETF), October, 2005, which is incorporated herein by reference. In these embodiments, TX controller 64 and combiner 40 block such synchronous tributaries by discarding the packets belonging to the respective packet streams.

When link 20 transports data packets in addition to synchronous connections, combiner 40 may comprise packet control units 56, which regulate the packets arriving from respective packet sources 36. For example, units 56 may block packets from reaching MUX 60 or buffer the packets in a queue until the available data rate is sufficient for multiplexing them. Alternatively, units 56 may filter the packets according to any suitable policy or criterion, so that only some of the packets reach MUX 60. Further alternatively, units 56 may interact with the packet sources so as to affect the rate or size of arriving packets. Some exemplary packet rate control methods are described in U.S. Patent Application Publication 2005/0075078, cited above.

Typically, the a-priori configuration of link 20 defines relative priorities among tributaries 32 and packet sources 36, with regard to selective blocking and packet control. For example, tributaries that are associated with voice services may be given precedence over tributaries that provide data services. As another example, synchronous tributaries may be given precedence over packet sources. Any other suitable policy can also be used.

TX controller 64 may exercise various policies, rules or conditions for determining which tributaries to block, and/or which packets or packet sources to regulate. Given the currently-available data rate, the TX controller may determine the appropriate blocking configuration as a function of various attributes of the tributaries and packet sources, such as the data rates of the different tributaries, the packet rates or expected rates of the different packet sources, the desired QoS, latency or real-time constraints of certain tributaries or packet sources, the priorities defined among the tributaries and packet sources, and/or any other suitable parameter.

For example, the TX controller can compute a score for each tributary and packet source, as a function of the operational parameters described above. The tributaries and packet sources having the lowest scores are then progressively blocked or regulated, so that the data rate of the composite data stream does not exceed the currently-available data rate.

In some embodiments, packets are regulated on a packet-by-packet basis, based on attributes of the packets and not according to the identity of the packet source. For example, a particular packet source may be assigned a maximum bandwidth. When the actual bandwidth of the arriving packets exceeds the maximum level, the packets are regulated on a packet-by-packet basis. The maximum bandwidth can be specified for a single packet source, for a group of sources or for all sources. Various criteria can be used for deciding which packets are allowed and which are discarded. For example, packets can be regulated based on a traffic flow, application or service with which the packets are associated. Alternatively, packets can be regulated based on any other packet attribute, such as source address, destination address or other header field. In some embodiments, the regulation process may take into account both the packet attributes and the identity of the packet source 36 from which the packet arrives.

In some embodiments, a finite set of blocking configurations is pre-specified as part of the ACM profiles of the link. In these embodiments, a set of ACM profiles is defined during link configuration. Each ACM profile comprises a specific choice of modulation scheme and FEC code, and an associated setting of units 52 and units 56. The setting of units 52 and 56 in a particular ACM profile specifies which tributaries are blocked and which packets or packet sources are regulated when the link operates at this ACM profile, such that the resulting data rate of the composite data stream at the output of combiner 40 matches the data rate defined by the modulation scheme and FEC code used.

The blocking configuration used by TX system 24 is reported to RX system 28, so that demultiplexer 80 is able to demultiplex the different tributaries and packets correctly. When the blocking configuration is part of the ACM profiles of the link, coordinating the ACM profile inherently coordinates the blocking configuration. Otherwise, the specific blocking configuration should be reported to the RX system, such as using the management information transmitted from TX controller 64 to RX controller 88.

In some cases, the aggregate data rate of the multiplexed tributaries and packet sources does not exceed, but is not exactly equal to the link data rate defined by the ACM profile. In these cases, extra bandwidth can sometimes be provided to one of the tributaries. Alternatively, the extra bandwidth can sometimes be used to reduce the code rate of the ECC in order to improve the link budget. Further alternatively, MUX 60 or TX 44 may add dummy data or use any other mechanism, in order to match the data rate of the composite data stream to the data rate of the link.

Figure 2:
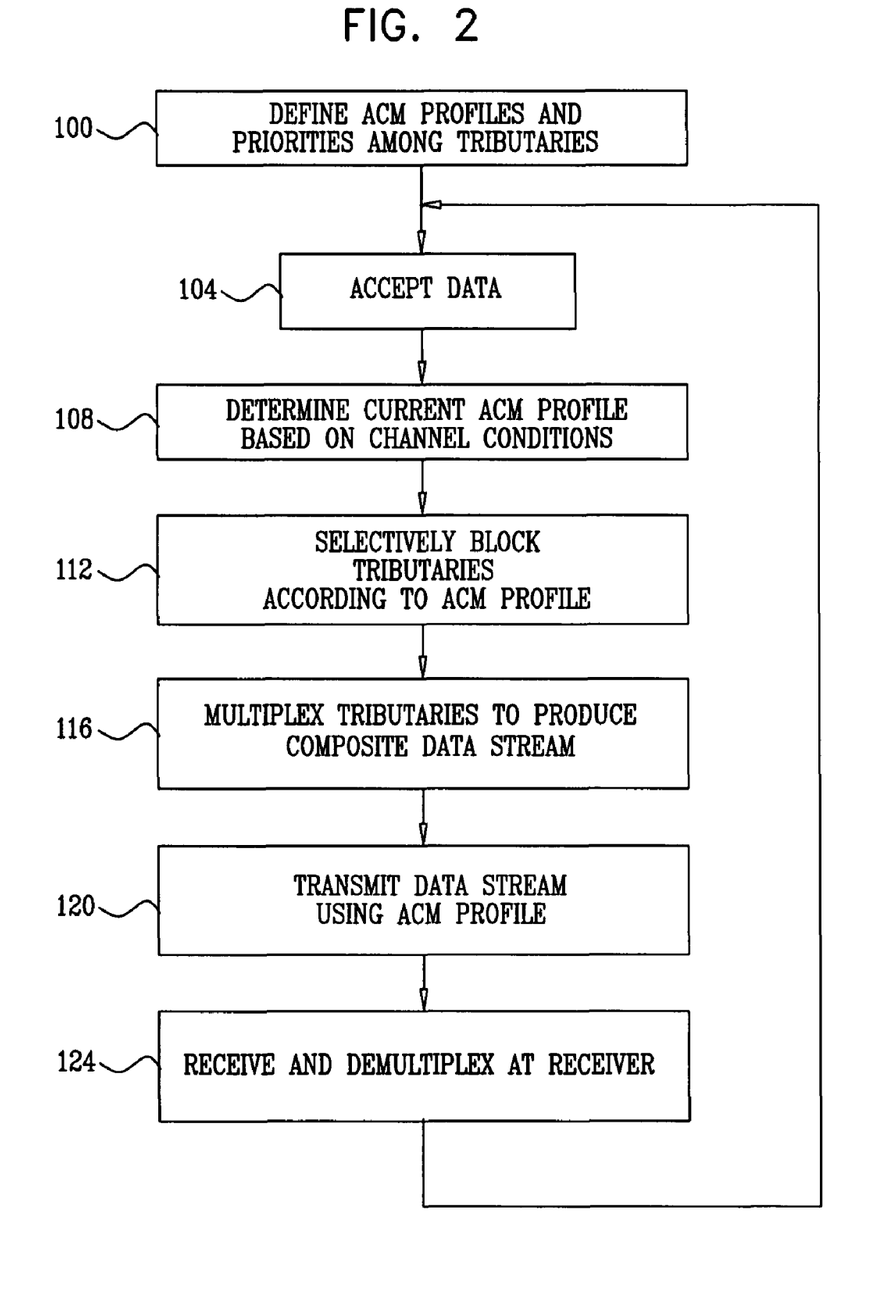
FIG. 2 is a flow chart that schematically illustrates a method for transporting synchronous connections over a variable-rate communication link, in accordance with an embodiment of the present invention.

FIG. 2 is a flow chart that schematically illustrates a method for transporting synchronous connections over variable-rate communication link 20, in accordance with an embodiment of the present invention. In the exemplary embodiment of FIG. 2, the blocking configurations are pre-specified in the ACM profiles of the link. The method begins with a system designer or other user defining a set of ACM profiles, and the blocking configuration associated with each ACM profile, at a definition step 100.

TX system 24 accepts input data from tributaries 32 and packet sources 36, at a data acceptance step 104. The TX controller and/or RX controller select the appropriate ACM profile, at a profile selection step 108. Typically, RX 76 and/or RX controller 88 evaluate a reception quality metric, as described above. Based on the evaluated quality metric and the desired QoS, the RX controller and/or TX controller select the appropriate ACM profile. Since the selected profile specifies a particular modulation scheme and a particular FEC code, it defines the currently-available data rate of the link.

TX system 24 selectively blocks tributaries 32 and selectively controls packet sources 36, at a blocking step 112. TX controller 64 controls combiner 40 to set units 52 and 56, in accordance with the ACM profile selected at step 108 above. Combiner 40 multiplexes the tributaries and data packets that are not blocked, at a multiplexing step 116. The combiner thus produces a composite data stream, whose data rate matches the currently-available data rate of the link.

TX 44 transmits the composite data stream, at a transmission step 120. TX 44 encodes and modulates the composite data stream according to the selected ACM profile, and transmits the signal to RX system 28. RX system 28 receives the signal, at a reception step 124. RX 76 receives, demodulates and decodes the signal according to the selected ACM profile. Demultiplexer 80, having been notified of the blocking configuration used by MUX 60, separates the composite data stream, and reconstructs and outputs the different synchronous tributaries and data packets.

Although the embodiments described herein mainly address transporting synchronous connections over microwave or millimeter point-to-point communication links, the principles of the present invention can also be used in other applications, such as in point-to-multipoint systems and in satellite links.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
accepting input data from two or more data sources, one or more of which comprise continuous synchronous tributaries, for transmission over a wireless communication link having a variable data rate;
assigning respective relative priorities to the data sources;
determining a currently-available data rate of the communication link;
multiplexing the input data accepted from the data sources to produce a composite data stream;
selectively omitting the input data of at least one of the tributaries from the composite data stream based on the respective relative priorities, in order to match the data rate of the composite data stream to the currently-available data rate of the communication link; and
transmitting the composite data stream over the communication link.

2. The method according to claim 1, wherein the input data in each of the tributaries is multiplexed using Time-Division-Multiplexing (TDM).

3. The method according to claim 1, wherein the communication link comprises a point-to-point link.

4. The method according to claim 1, wherein determining the currently-available data rate comprises receiving the transmitted composite data stream at an opposite side of the communication link, estimating a reception quality of the received composite data stream, and determining the currently-available data rate responsively to the estimated reception quality.

5. The method according to claim 4, wherein estimating the reception quality comprises evaluating a reception quality metric comprising at least one metric selected from a group of metrics consisting of a Received Signal Level (RSL), a Signal to Noise Ratio (SNR), a Signal to Interference and Noise Ratio (SINR), a Mean Square Error (MSE), a Bit Error Rate (BER) and a Frame Error Rate (FER) of the received composite data stream.

6. The method according to claim 4, wherein transmitting the composite data stream comprises encoding the composite data stream using a Forward Error Correction (FEC) code, wherein receiving the transmitted composite data stream comprises decoding the FEC code using a FEC decoder, and wherein estimating the reception quality comprises estimating the reception quality using a metric provided by the FEC decoder.

7. The method according to claim 4, wherein receiving the transmitted composite data stream comprises filtering the received composite data stream using an adaptive equalizer comprising adaptive coefficients, and wherein the reception quality metric is based on values of the adaptive coefficients.

8. The method according to claim 1, wherein transmitting the composite data stream comprises selecting an Adaptive Coding and Modulation (ACM) profile, which corresponds to the currently-available data rate, from a set of predetermined ACM profiles that define respective modulation schemes and Forward Error Correction (FEC) codes, encoding the composite data stream using a FEC code defined by the selected ACM profile and modulating the encoded data stream using a modulation scheme defined by the selected ACM profile.

9. The method according to claim 8, wherein assigning the relative priorities comprises specifying in each ACM profile which of the data sources to omit from the composite data stream when selecting the ACM profile, and wherein multiplexing the input data comprises omitting the input data of the data sources specified in the selected ACM profile out of the composite data stream.

10. The method according to claim 1, wherein accepting the input data comprises accepting a sequence of data packets that encapsulate one of the synchronous tributaries, and wherein omitting the input data of the one of the tributaries from the composite data stream comprises discarding the data packets in the sequence.

11. The method according to claim 1, wherein one or more of the data sources comprise packet sources, wherein accepting the input data comprises accepting data packets for transmission over the communication link from the packet sources, wherein assigning the relative priorities comprises jointly assigning the priorities to the tributaries and to the packets, and wherein multiplexing the input data comprises jointly multiplexing the input data accepted from the tributaries and the data packets accepted from the packet sources, while selectively regulating a flow of the data packets.

12. The method according to claim 11, wherein assigning the priorities to the packets comprises assigning a respective priority value individually to each packet.

13. The method according to claim 11, wherein assigning the priorities to the packets comprises assigning a respective priority value to each of the packet sources.

14. The method according to claim 1, wherein assigning the relative priorities comprises computing numerical scores of the respective tributaries based on attributes of the tributaries, and wherein selectively omitting the input data from the composite data stream comprises progressively omitting the tributaries having the lowest scores, until the data rate of the composite data stream does not exceed the currently-available data rate of the communication link.

15. The method according to claim 1, and comprising receiving the transmitted composite data stream by a receiver at an opposite side of the communication link and de-multiplexing the received composite data stream, so as to reconstruct the input data.

16. The method according to claim 15, wherein transmitting the composite data stream comprises indicating which of the data sources are multiplexed in the composite data stream to the receiver, so as to enable the receiver to de-multiplex the received composite data stream.

17. The method according to claim 1, wherein the input data of at least one of the tributaries comprises hierarchically-structured TDM data.

18. The method according to claim 1, wherein the communication link comprises one of a microwave and a millimeter-wave link.

19. The method according to claim 1, wherein the wireless communication link is one of a plurality of wireless communication links operated in a point-to-multipoint configuration.

20. A method for communication, comprising:
accepting input data from two or more data sources, one or more of which comprise continuous synchronous tributaries, for transmission over a wireless communication link having a variable data rate;
assigning respective relative priorities to the data sources;
determining a currently-available data rate of the communication link;

multiplexing the input data accepted from the data sources to produce a composite data stream;

selectively omitting the input data of at least one of the data sources from the composite data stream based on the respective relative priorities, in order to match the data rate of the composite data stream to the currently-available data rate of the communication link; and transmitting the composite data stream over the communication link.

21. A communication apparatus, comprising:

a combiner, which is arranged to multiplex input data that is accepted from two or more data sources, one or more of which comprise continuous synchronous tributaries, to produce a composite data stream;

a variable-rate transmitter, which is arranged to transmit the composite data stream over a communication link at a currently-available data rate of the communication link; and a processor, which is arranged to determine the currently-available data rate and to cause the combiner to selectively omit the input data of at least one of the tributaries from the composite data stream based on relative priorities assigned to the data sources, in order to match the data rate of the composite data stream to the currently-available data rate of the communication link.

22. The apparatus according to claim 21, wherein the input data in each of the tributaries is multiplexed using Time-Division-Multiplexing (TDM).

23. The apparatus according to claim 21, wherein the communication link comprises a point-to-point link.

24. The apparatus according to claim 21, and comprising a receiver, which is arranged to receive the transmitted composite data stream and to estimate a reception quality of the received composite data stream, wherein at least one of the processor and the receiver is arranged to determine the currently-available data rate responsively to the estimated reception quality.

25. The apparatus according to claim 24, wherein the receiver is arranged to estimate the reception quality by evaluating a reception quality metric comprising at least one metric selected from a group of metrics consisting of a Received Signal Level (RSL), a Signal to Noise Ratio (SNR), a Signal to Interference and Noise Ratio (SINR), a Mean Square Error (MSE), a Bit Error Rate (BER) and a Frame Error Rate (FER) of the received composite data stream.

26. The apparatus according to claim 24, wherein the transmitter is arranged to encode the composite data stream using a Forward Error Correction (FEC) code, wherein the receiver comprises a FEC decoder, which is arranged to decode the FEC code, and wherein the receiver is arranged to estimate the reception quality using a metric provided by the FEC decoder.

27. The apparatus according to claim 24, wherein the receiver comprises an adaptive equalizer, which is arranged to filter the received composite data stream using adaptive coefficients, and wherein the reception quality metric is based on values of the adaptive coefficients.

28. The apparatus according to claim 21, wherein the transmitter is arranged to select an Adaptive Coding and Modulation (ACM) profile, which corresponds to the currently-available data rate, from a set of predetermined ACM profiles that define respective modulation schemes and Forward Error Correction (FEC) codes, and to transmit the composite data stream by encoding the composite data stream using a FEC code defined by the selected ACM profile and modulating the encoded data stream using a modulation scheme defined by the selected ACM profile.

29. The apparatus according to claim 28, wherein each ACM profile specifies which of the tributaries to omit from the composite data stream when selecting the ACM profile, and wherein the combiner is arranged to multiplex the input data while omitting the input data of the tributaries specified in the selected ACM profile from the composite data stream.

30. The apparatus according to claim 21, wherein the input data comprises a sequence of data packets that encapsulate one of the synchronous tributaries, and wherein the transmitter is arranged to cause the combiner to omit the input data of the one of the synchronous tributaries from the composite data stream by discarding the data packets in the sequence.

31. The apparatus according to claim 21, wherein one or more of the data sources comprise packet sources, wherein the combiner is further arranged to accept data packets for transmission over the communication link from the packet sources, wherein the relative priorities are jointly assigned to the tributaries and to the packets, and wherein the combiner is arranged to jointly multiplex the input data accepted from the tributaries and the data packets accepted from the packet sources, while selectively regulating a flow of the data packets.

32. The apparatus according to claim 31, wherein respective priority values are assigned individually to each of the packets.

33. The apparatus according to claim 31, wherein respective priority values are assigned to each of the packet sources.

34. The apparatus according to claim 21, wherein the processor is arranged to assign the relative priorities by computing numerical scores of the respective tributaries based on attributes of the tributaries and to cause the combiner to progressively omit the tributaries having the lowest scores, until the data rate of the composite data stream does not exceed the currently-available data rate of the communication link.

35. The apparatus according to claim 21, and comprising a receiver, which is arranged to receive the transmitted composite data stream and to de-multiplex the received composite data stream, so as to reconstruct the input data.

36. The apparatus according to claim 35, wherein the processor is arranged to indicate which of the data sources are multiplexed in the composite data stream to the receiver, so as to enable the receiver to de-multiplex the received composite data stream.

37. The apparatus according to claim 21, wherein the input data of at least one of the tributaries comprises hierarchically-structured TDM data.

38. The apparatus according to claim 21, wherein the communication link comprises one of a microwave and a millimeter-wave link.

39. The apparatus according to claim 21, wherein the communication link is one of a plurality of communication links operated in a point-to-multipoint configuration.

40. A communication apparatus, comprising:

a combiner, which is arranged to multiplex input data that is accepted from two or more data sources, one or more of which comprise continuous synchronous tributaries, to produce a composite data stream;

a variable-rate transmitter, which is arranged to transmit the composite data stream over a communication link at a currently-available data rate of the communication link; and a processor, which is arranged to determine the currently-available data rate and to cause the combiner to selectively omit the input data of at least one of the data sources from the composite data stream based on relative priorities assigned to the data sources, in order to match the data rate of the composite data stream to the currently-available data rate of the communication link.

41. Apparatus for providing a variable-rate communication link, the apparatus comprising:

a transmitting system, which is arranged to accept input data from two or more data sources, one or more of which comprise continuous synchronous tributaries, to multiplex the input data accepted from the data sources to produce a composite data stream, while selectively omitting the input data of at least one of the tributaries from the composite data stream based on relative priorities assigned to the respective data sources, in order to match the data rate of the composite data stream to a currently-available data rate of the communication link, and to transmit the composite data stream over a wireless channel; and a receiving system, which is arranged to receive the transmitted composite data stream and to de-multiplex the composite data stream so as to reconstruct the input data.

42. The apparatus according to claim 41, wherein the input data in each of the tributaries is multiplexed using Time-Division-Multiplexing (TDM).

* * * * *